(12) United States Patent
Weeks

(10) Patent No.: US 6,338,057 B1
(45) Date of Patent: Jan. 8, 2002

(54) INFORMATION MANAGEMENT AND RETRIEVAL

(75) Inventor: Richard Weeks, Felixstowe (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/194,944

(22) PCT Filed: Nov. 18, 1998

(86) PCT No.: PCT/GB98/03468

§ 371 Date: Dec. 7, 1998

§ 102(e) Date: Dec. 7, 1998

(87) PCT Pub. No.: WO99/27469

PCT Pub. Date: Jun. 3, 1999

(30) Foreign Application Priority Data

Nov. 24, 1997 (EP) .............................................. 97309446

(51) Int. Cl.⁷ .............................................. G06F 17/30
(52) U.S. Cl. ................................................. 707/3; 704/1
(58) Field of Search .............................. 707/3, 4, 5, 6; 704/1, 2, 3, 4, 7, 10

(56) References Cited

U.S. PATENT DOCUMENTS

| | | | | |
|---|---|---|---|---|
| 4,342,085 A | * | 7/1982 | Glickman et al. | 364/300 |
| 5,325,298 A | * | 6/1994 | Gallant | 364/419.19 |
| 5,463,773 A | * | 10/1995 | Sakakibara et al. | 395/600 |
| 5,642,518 A | * | 6/1997 | Kiyama et al. | 395/757 |
| 5,745,602 A | * | 4/1998 | Chen et al. | 382/229 |
| 5,774,888 A | * | 6/1998 | Light | 707/5 |
| 5,794,177 A | * | 8/1998 | Carus et al. | 704/9 |
| 5,924,105 A | * | 7/1999 | Punch, III et al. | 707/513 |
| 5,931,907 A | * | 8/1999 | Davies et al. | 709/218 |
| 5,937,422 A | * | 8/1999 | Nelson et al. | 707/531 |
| 5,940,624 A | * | 8/1999 | Kadashevich et al. | 395/759 |
| 5,987,446 A | * | 11/1999 | Corey et al. | 707/3 |
| 6,026,398 A | * | 2/2000 | Brown et al. | 707/5 |
| 6,044,376 A | * | 3/2000 | Kurtzman, II | 707/102 |
| 6,081,804 A | * | 6/2000 | Smith | 707/5 |

OTHER PUBLICATIONS

G. Salton, Recent Studies in Automatic Text Analysis and Document Retrieval; Journal of the Association for Computing Machinery, vol. 20, No. 2, Apr. 1973, pp. 258–278.*

C. Jaquemin et al., "Retrieving Terms and Their Variants in a Lexicalized Unification–based Framework", Sigir '94, Dublin, Jul. 3–6, 1994, No. Conf. 17, Jul. 3, 1994, pp. 132–141, XP000475318.*

C. Buckley et al., "Automatic Routing and Retrieval Using Smart: Trec–2", Information Processing & Management (Incorporation Information Technology), vol. 31, No. 3, May 1, 1995, pp. 315–326, XP000561236.*

* cited by examiner

Primary Examiner—Thomas Black
Assistant Examiner—Mary Wang
(74) Attorney, Agent, or Firm—Nixon & Vanderhye P.C.

(57) ABSTRACT

A method and apparatus is provided for extracting key terms from a data set, the method includes identifying a first set of one or more word groups of one or more word that occur more than once in the data set, and removing from this first set a second set of word groups that are sub-strings of longer word groups in the first set. The remaining word groups are key terms. Each word group is weighted according to its frequency of occurrence within the data set. The weighting of any word group may be increased by the frequency of any sub-string of words occurring in the second set and then dividing each weighting by the number of words in the word group. This weighting process operates to determine the order of occurrence of the word groups. Prefixes and suffixes are also removed from each word in the data set. This produces a neutral form of each word so that the weighting values are prefix and suffix independent.

26 Claims, 9 Drawing Sheets

INFORMATION MANAGEMENT AND RETRIEVAL

BACKGROUND OF THE INVENTION

1. Field of the Invention

This invention lies in the field of methods and apparatus for data management and retrieval and finds particular application to the field of methods and apparatus for identifying key data items within data sets.

2. Related Art

Recent advances in technology, such as CD-ROMs, Intranets and the World Wide Web have provided a vast increase in the volume of information resources that are available in electronic format.

A problem associated with these increasing information resources is that of locating and identifying data sets (e.g. magazine articles, news articles, technical disclosures and other information) of interest to the individual user of these systems.

Information retrieval tools such as search engines and Web guides are one means for assisting users to locate data sets of interest. Proactive tools and services (e.g. News groups, broadcast services such as the POINTCAST™ system available on the Internet at www.pointcast.com or tools like the JASPER agent detailed in the applicant's co-pending international patent application PCT GB96/00132 (U.S. application Ser. No. 08/875,091 filed Jul. 22, 1997, now U.S. Pat. No. 5,931,907) the subject matter of which is incorporated herein by reference) may also be used to identify information that may be of interest to individual users.

In order for these information retrieval and management tools to be effective, either a summary or a set of key words is often identified for any data set located by the tool, so that users can form an impression of the subject matter of the data set by reviewing this set of key words or by reviewing the summary.

Summarising tools typically use the key words that occur within a data set as a means of generating a summary. Key words are typically identified by stripping out conjunctures such as "and", "with", and other so-called low value words such as "it", "are", "they" etc, all of which do not tend to be indicative of the subject matter of the data set being investigated by the summarising tool.

Increasingly key words and key phrases are also being used by information retrieval and management tools as a means of indicating a user's preference for different types of information. Such techniques are known as "profiling" and the profiles can be generated automatically by a tool in response to a user indicating that a data set is of interest, for example by bookmarking a Web page or by downloading data from a Web page.

Advanced profiling tools also use similarity matrices and clustering techniques to identify data sets of relevance to a user's profile. The JASPER tool, referred to above, is an example of such a tool that uses profiling techniques for this purpose.

In the Applicant's co-pending European patent application number EP 97306878.6 (corresponding to U.S. application 09/155,172 filed Sep. 22, 1998), the subject matter of which is incorporated herein by reference, a means of identifying key terms consisting of several consecutive words is disclosed. These key terms are used as well as individual key words within a similarity matrix. This enables terms such as "Information Technology" and "World Wide Web" to be recognised as terms in their own right rather than as two or three separate key words.

However these techniques for identifying key words and phrases are less than optimal because they eliminate conjunctive words and other low value words in order to identify the key words and phrases of a particular data set. They only identify phrases which contain high value words alone, such as "information retrieval". However, conjunctive terms often provide a great deal of contextual information.

For example, in the English language, the phrase "bread and butter" has two meanings. The first relates to food and the second relates to a person's livelihood or a person's means of survival. Similarly, in the English language, the term "bread and water" again relates to food and also has a second meaning that is often used to imply hardship.

An information retrieval or management tool that eliminates all conjunctive words during the process of identifying key words and phrases in a block of text would reduce the phrases "bread and butter" and "bread and water" to a list of key words consisting of "bread", "butter", "water". In such a list, the second meanings of hardship and a person's livelihood are lost.

A further problem is that names such as "Bank of England", "Stratford on Avon" or terms such as "black and white", "on and off" are reduced to their constituent, higher value words, thus altering the information returned by the tool.

SUMMARY OF THE INVENTION

According to a first aspect of the present invention there is provided an apparatus for managing data sets, having: an input means for receiving data sets as input; means adapted to identify, within a said data set, a first set of words comprising one or more word groups of one or more words, conforming to a predetermined distribution pattern within said data set, wherein said words in said word groups occur consecutively in the data set; means adapted to identify, within said first set, a sub-set of words comprising one or more of said word groups, conforming to a second predetermined distribution pattern within said data set; means adapted to eliminate said sub-set of words from said first set thereby forming a set of key terms of said data set; and output means for outputting at least one said key term.

According to a second aspect of the present invention there is provided a method of managing data sets, including the steps of:

1) receiving a data set as input;
2) identifying a first set of words conforming to a first distribution pattern within said data set, said first set comprising one or more word groups of one or more words, wherein said words in said word groups occur consecutively in the data set;
3) identifying a sub-set of word groups in said first set, said sub-set conforming to a second distribution pattern within said data-set;
4) eliminating said sub-set from said first set thereby identifying a set of key terms;
5) outputting said key terms.

Thus embodiments of the present invention identify, within a received data set, a first set of word groups of one or more words according to a first pattern within the data set and then identify a second pattern of word groups from within the first set. The key terms are those groups of one or more words within the first set that do not conform to the second pattern.

The approach of identifying, within the data set, patterns of word groups, enables key terms to be extracted without first eliminating low value words. This has the advantage that conjunctive words and other low value words can be retained within the data set so that terms such as "on and off", "bread and water" and "chief of staff" can be identified as key terms in their own right.

This improves the quality of the key terms extracted and also allows key terms of arbitrary length to be identified.

Preferably said first distribution pattern requires that each word group in the first set occurs more than once in said data set and preferably said second distribution pattern requires that each word group in the sub-set comprises a word or a string of words that occurs within a larger word group in the first set.

Thus embodiments of the present invention pick out any repeated words and phrases, and then eliminate any word or phrase already contained in a longer one. For instance, if a document refers to "Internet search engines" more than once, the whole phrase will become a key term but "Internet" and "search engine" on their own would be eliminated, as would "search" and "engine" as single words.

Preferably said first aspect includes means for modifying said word groups, adapted to remove low value words occurring before the first high value word in a word group and adapted to remove low value words occurring after the last high value word in a word group. In the trivial case of a word group composed of a single, low value word, the word group itself will be eliminated.

Preferably said second aspect includes the step of:

6) removing any low value word occurring before the first high value word in a word group and removing any low value word occurring after the last high value word in a word group.

Removing low value words from the beginning and end of word groups improves the quality of the word groups returned by the key term extractor.

Preferably the first aspect includes means for weighting each said word group in said first set according to how frequently each said word group occurs in said first set and means for modifying said weighting of at least a first word group in proportion to a weighting of a second word group in said sub-set and means for selecting said key terms for output in dependence upon said weightings.

Preferably the second aspect includes the steps of:

9) weighting each word group in said first set according to how frequently each said word group occurs in said first set;

10) modifying said weightings of at least a first word group in said first set in proportion to a weighting of a second word group in said sub-set;

11) selecting said key terms for output in dependence upon said weightings.

Weighting word groups according to their frequency of occurrence provides a mechanism for ordering the identified key terms.

Modifying weightings according to the weighting of terms in the sub-set enables terms eliminated from the first set to influence the weightings of those terms that remain and of which the eliminated terms form sub-strings. In this way, a sub-string that occurs frequently within the data set may have an appropriate influence on the identification of key terms.

An assumption is made that those key terms occurring most frequently are most relevant to the information content of the data set.

Preferably the first aspect includes means for modifying any word in any word group, adapted to remove any prefix and adapted to remove any suffix from a word to form a stemmed word.

Preferably the second aspect includes the step of:

7) modifying any word in any said word group by removing a prefix or suffix from the word thereby forming a stemmed word.

The removal of prefixes and suffixes allows each word to be reduced to a neutral form so that weightings independent of prefixes and suffixes can be calculated.

Thus words that are repeated but with different prefixes and/or suffixes are accounted for as repeat occurrences of the same word.

Preferably the first aspect includes means for storing said prefix or suffix in association with said stemmed word thereby enabling said prefix or suffix to be restored to said stemmed word.

Preferably the second aspect includes the step of:

8) storing said removed prefix or suffix in association with said stemmed word thereby enabling said prefix or suffix to be restored to said stemmed word.

Restoring prefixes and suffixes to stemmed words improves the quality of key terms forming output of embodiments of the present invention.

BRIEF DESCRIPTION OF THE DRAWINGS

Embodiments of the invention will now be described, by way of example only, with reference to the accompanying drawings in which.

DETAILED DESCRIPTION OF EXEMPLARY EMBODIMENTS

The present invention is likely to be of particular value in the field of data management and retrieval tools. In particular, any data management and retrieval tool with a need to the extract key terms from data sets, and to use such key terms, may benefit from the present invention. For example, key terms may be used within data management tools such as document summarisers, profiling tools, search engines and proactive data management tools such as the JASPER tool referred to above.

In one particular application, the present invention may extract key terms from data sets without first stripping away conjunctive words and other so-called "low-value words" from the data set. Conjunctive and low-value words can often introduce subtleties to the meanings of key terms and phrases. By retaining the conjunctive and low-value words, these subtleties may be retained. This improves the quality of extracted key terms and phrases in comparison with prior art systems, both from a user's perception of the key terms themselves and in relation to improvements in the operation of other data management tools using such key terms as input.

Typically, automatically extracted key terms may be used in two main ways. They may be used by a data management tool, or they may be presented directly to a user. Data management tools are often less concerned with the quality of presentation of key terms. Data management tools may accept key terms including words in a word-stemmed state, or words having dubious capitalisation, with little effect on the tools' output.

However, when results are to be presented directly to a user, key terms with high presentation value are required. For example even one rogue term, say with dubious capitalisation, can impact heavily on the perceived quality of a tool's output. Phrases (which may have appeared in the document with various capitalisations and word endings) are preferably well-formatted. Key terms may preferably be limited in number, ensuring that those that are presented are likely to be of higher value to the user.

Figure 1:
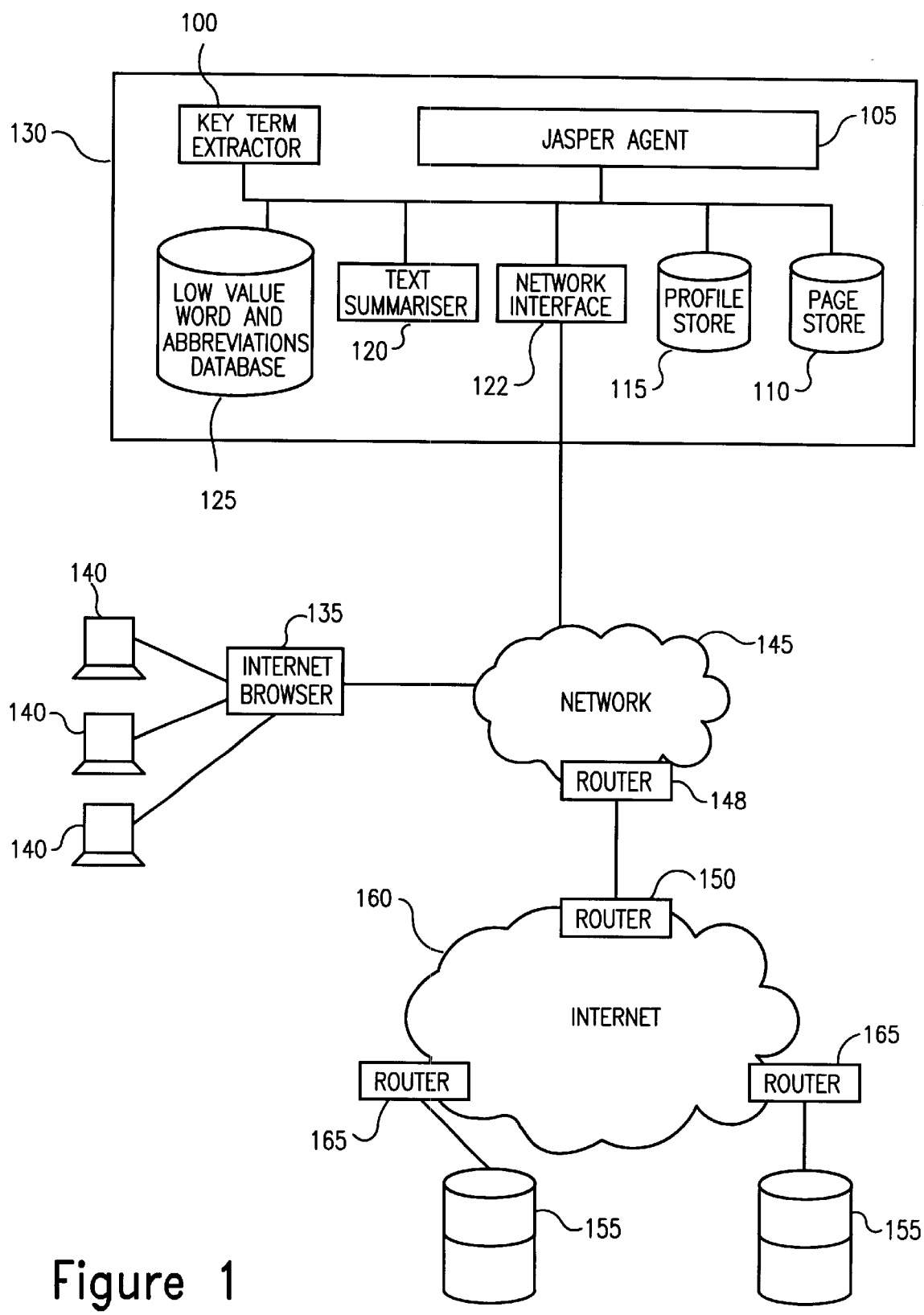
FIG. 1 is a schematic view of an information management and retrieval tool set incorporating a key term extractor according to embodiments of the present invention.

Referring to FIG. 1, a schematic representation of an information management and retrieval tool set is provided, the main components of which reside on a file server 130. The tool set comprises a key term extractor component 100, a JASPER agent 105, a page store 110, a profile store 115, a text summariser 120, a network interface 122 and a low value word and abbreviations database 125.

The file server 130 communicates with a network 145 via the network interface 122. The network 145 may for example be a private corporate network, for example one using Internet protocols, a public switched telephone network (PSTN) or a public data network. The network 145 may include a router 148 providing a gateway access to the Internet 160. Users of the information management tools residing on the server 130 may gain access over the network 145 using an appropriate Internet viewer 135, such as a conventional Internet browser product running on a personal computer, linked to the network 145, with user interfaces 140 provided by the personal computers themselves or by work stations.

Information management tools incorporated within the server 130 may gain access to the Internet 160 via the network 145, its router 148 and an Internet router 150. Internet service provider servers 155 may be accessed over the Internet 160 via appropriate routers 165 as required.

An information management and retrieval tool set might use the above components of FIG. 1 to enable an operator of a user interface 140 to locate information via the Internet 160.

For example, the JASPER agent 105 may have accessed user profiles, stored in the profile store 115, in order to perform an overnight search for documents, accessible over the Internet 160, of potential interest to users. The JASPER agent 105 stores information about retrieved documents in the page store 110. Using a particular user's profile retrieved from the profile store 115, the JASPER agent 105 may then access the page store 115 and compare key terms in the user's profile with the document information held in the page store 110. The key term extractor 100 of the present invention may be applied both to generation of terms for use in user profiles and in extracting key terms from retrieved documents for use in gauging a document's relevance. For further detail on the JASPER agent 105 of this embodiment, reference may be made to international patent application number PCT GB96/00132 (U.S. Pat. No. 5,951,907).

The key term extractor 100 may be an active tool that continuously monitors pages downloaded from an Internet service provider's file server 155. The key term extractor 100 may then pass these key terms to other tools such as the JASPER agent 105, where further processing determines whether further action should be taken by the information management and retrieval tool set in respect of a downloaded page.

Alternatively, the key term extractor 100 may be called by the JASPER agent 105 or by the summarising tool 120 in response to a page being selected for storage in the page store 110.

In either case, the key term extractor tool 100 will analyse the page and extract from it key terms, preferably independently of operator input.

The key terms may be simply stored by information management and retrieval tools as a headline summary of a particular document for use by users at a later date.

Alternatively, the key terms may be passed on to a profile tool (within the JASPER agent 105) which may use these key terms to update either or both of a user's profile or a particular document term matrix. (For further information on the profile tool or on document term matrices, reference may be made to international patent application number PCT GB96/00132—or U.S. Pat. No. 5,931,907).

The key terms (and possibly some associated processing results from the key term extractor 100) may be passed on to the summarising tool 120, which may include some of all of them in a generated summary.

Figure 2:
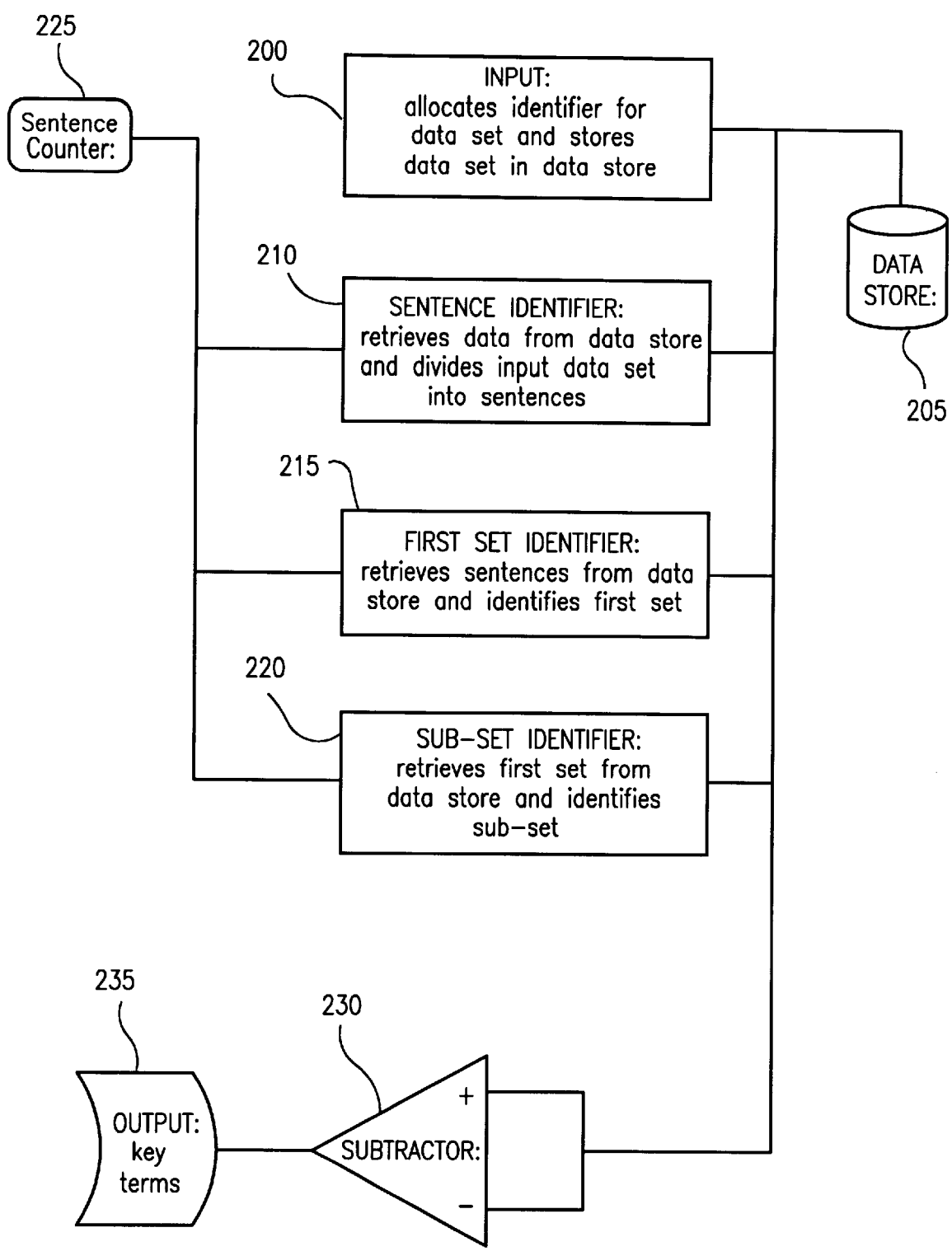
FIG. 2 is a diagram showing the main functional components of a preferred key term extraction apparatus.

Referring to FIG. 2, a diagram is presented showing the principal functional blocks in a preferred embodiment of a key term extractor apparatus 100. Each of the functional blocks may implement an appropriate portion of the processing, to be described in detail below. In overview, an input 200 receives data sets including portions of text, allocating to each data set an identifier and storing each data set in a data store 205. A sentence identifier 210 operates on a stored data set to divide included text into sentences and to store the sentences in the data store 205 as appropriate. A first set identifier 215 operates to identify a first set of word groups from stored sentences relating to a particular data set. The first set identifier may apply any appropriate selection criteria to the selection of word groups for inclusion in the first set. A sub-set identifier 220 operates to identify a sub-set of word groups from a first set using any appropriate selection criteria. The sentence identifier 210, first set identifier 215 and sub-set identifier 220 operate in conjunction with a sentence counter 225 to enable sentences identified within a particular data set to be scanned as required. A subtractor 230 is arranged to receive a first set from the first set identifier 215 at a "+" input and a corresponding sub-set from the sub-set identifier 220 at a "−" input. The subtractor 230 performs a "subtraction" to eliminate word groups of the received sub-set from those of the received first set to result in a set of key terms, to be output by the output 235

Embodiments of the present invention may be applied to tools for the management of data sets containing text information, where this management relies at least in part on word sequences that occur more than once in a data set and where these word sequences are not sub-strings of any other word sequences that occur more than once. Such selection criteria may be demonstrated by way of the following example. In this example, capital letters, such as A, B, P, Q, etc. are used to represent words, strings of these letters being used to represent sentences. The present example uses the following "sentences", identified within a received data set:

A B C D E F - 1
P Q B C D E - 2
B E F C D P - 3
C D E B E F - 4

From these sentences, a first set of word groups may be selected according to the criterion that they occur more than once in the above data set (a more detailed description of this process and its implementation will be presented below):

| | |
|---|---|
| B C D E | (occurs twice, in sentences 1 & 2) |
| B E F | (occurs twice, in sentences 3 & 4) |
| C D E | (occurs three times, in sentences 1, 2 & 4) |
| C D | (occurs four times, in sentences 1, 2, 3 & 4) |
| E F | (occurs three times, in sentences 1, 3 & 4) |
| P | (occurs twice, in sentences 2 & 3) |

From this set, the following key terms may be selected from the first set above according to the second criterion that a word group does not form a sub-string of a longer word group in the first set:

B C D E
B E F
P

However, note that sub-strings 'CD' 'CDE' and 'EF' are not included as key terms. This is because all are sub-strings of the larger terms 'BCDE' or 'BEF'. However, if for example that larger term 'BCDE' only occurred once, then 'CDE' would feature as a key term.

A consequence of the two stage process outlined above is that if a data set contains the following terms in the following sequence:

. . . Jasper agent . . .
. . . Jasper . . .
. . . agent . . .
. . . Jasper agent . . .
. . . Jasper . . .
. . . agent . . .
. . . Jasper . . .
. . . agent . . .

then 'Jasper agent' will be a key term (as long as it is not subsumed into a longer term such as 'tool set including a Jasper agent'), but neither 'Jasper' nor 'agent' singly will be key terms, regardless of however many times they occur. This avoids presenting all three as key terms, relying on the assumption that by just presenting 'Jasper agent', all or most of the information is retained.

In addition, by taking into account the frequencies with which its component parts occur in the data set, a representative weighting for the term 'Jasper agent' can be computed. For example, if 'Jasper agent' occurs infrequently, and 'agent' with a similar frequency to 'Jasper agent', but the term 'Jasper' has a higher frequency, then the compound term 'Jasper agent' could be weighted against other key terms of the data set in recognition of this.

In preferred embodiments, the information management tool may ask the user to act in response to key terms presented, for example to accept or reject them, and an interface may offer the facility to select partial elements of key terms. Such a tool may be a profiling tool, for example, that allows a user to refine their personal profile by altering terms entered.

Preferred embodiments may also use full stops and other punctuation marks to break word sequences. This helps limit the length of the potential key terms.

Embodiments may implement further criteria for selection of word groups for the first set of the sub-set or both. Preferably, word groups may be selected having no leading or trailing low-value words. "Low-value words" include conjunctions, adverbs, and some common words such as: they, are, it, has, of, in, etc.

Returning now to the example above and representing low value words as lower case letters, the sentences may become:

a b C d E F - 1
P Q b C d E - 2
b E F C d P - 3
C d E b E F - 4

From these sentences, key terms having no leading or trailing low value words are now:

| | |
|---|---|
| C d E | sentences 1 and 2 |
| E F | sentences 1, 3 and 4 |
| P | sentences 2 and 3 |

Note how the 'b' is lost from the front of the term "bCdE", but that the internal 'd' is maintained. Accordingly, terms such as "bread and butter" and terms including other conjunctions and low value words may now be listed as key terms.

It is preferable that whole sentences are not listed as key terms. However, where a sentence occurs twice in a data set, the above method may include it as a key term unless sentence splitting and key term limiting techniques are employed.

Figure 3:
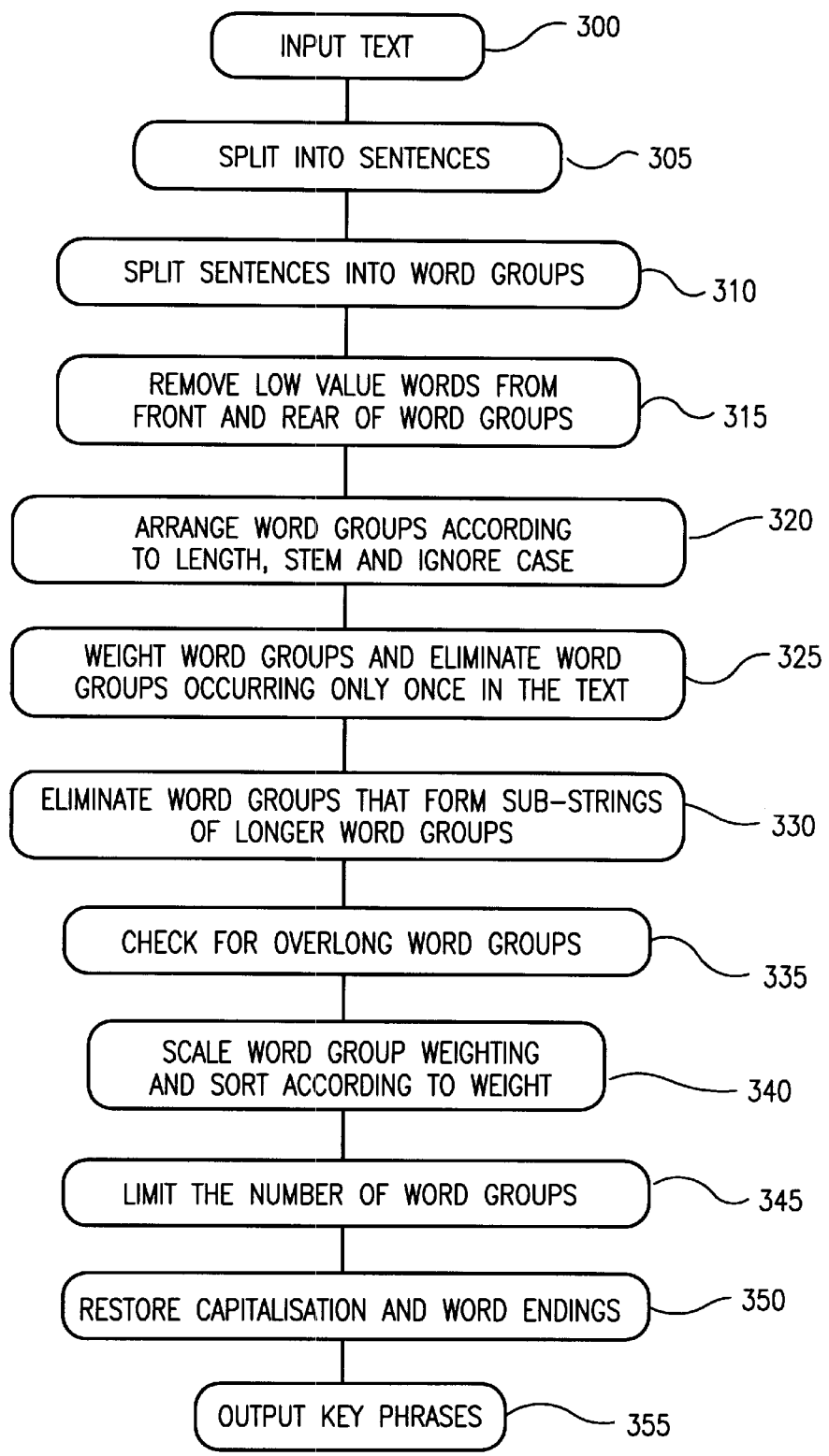
FIG. 3 is a flow diagram showing a method of key term extraction according to preferred embodiments of the present invention.

Referring to FIG. 3, a flow diagram is presented to show a preferred sequence of steps to be implemented by the key term extractor 100. These steps are listed below with further commentary on their operation.

STEP 300: input text
STEP 305: split the data set into sentences.
STEP 310: split each sentence into word groups of one or more words.
STEP 315: take each word group and remove any leading or trailing low-value terms.
STEP 320: store in order of the longest word group first down to the shortest word group and then stem each word and ignore case (stemming is the known technique comprising removal of prefixes and suffixes). Retain an association between each stemmed word and its removed prefixes and suffixes to enable restoration of the original word if required later.
STEP 325: give each word group an initial weight equal to its frequency of occurrence in the input text and ignore all word groups of weight 1 (i.e. ignore word groups that are not repeated).
STEP 330: propagate word groups upwards: starting with terms of length 1 (i.e. one word only) and working upwards, find the next shortest term that contains the candidate word group. Increase the weight of this word group by the weight of the candidate word group and remove the candidate word group. Repeat until no candidate word group is a substring of a longer word group.

STEP 335: Check that no word groups longer than a preselected (i.e. configurable) maximum allowable length remain. If such longer word groups do remain, add these word groups to a 'to-be-split' list, and repeat from step 310 above for word groups in the 'to be-split' list. Iterate until the condition at the start of this step is satisfied, or until the maximum word group length decreases no further.

STEP 340: scale the weight of each word group by dividing it by the number of words it contains and sort the word groups into decreasing scaled weight order.

STEP 345: apply a strategy to limit the number of key terms obtained from these word groups, typically selecting an appropriate number of word groups from those having the greatest weight.

STEP 350: where the word groups are to be presented to a user, map the word groups back to the 'real world'. In step 320, the potential word groups were stemmed and case information discarded in order to map the widest possible conceptually-equivalent set of word groups onto one neutral representative form. The inverse mapping restores capitalisations and word endings.

Note: in step 330 candidate word groups are eliminated from the list at the first instance of being identified as a sub-string of a longer word group. It is possible to propagate each sub-string all the way to the top of the list and to increase the weighting of each word group in which the candidate term is a sub-string. This process may preferably be used as an alternate means of weighting the key terms. However, it does not alter the outcome of the terms retained.

Algorithm Details

Figure 4:
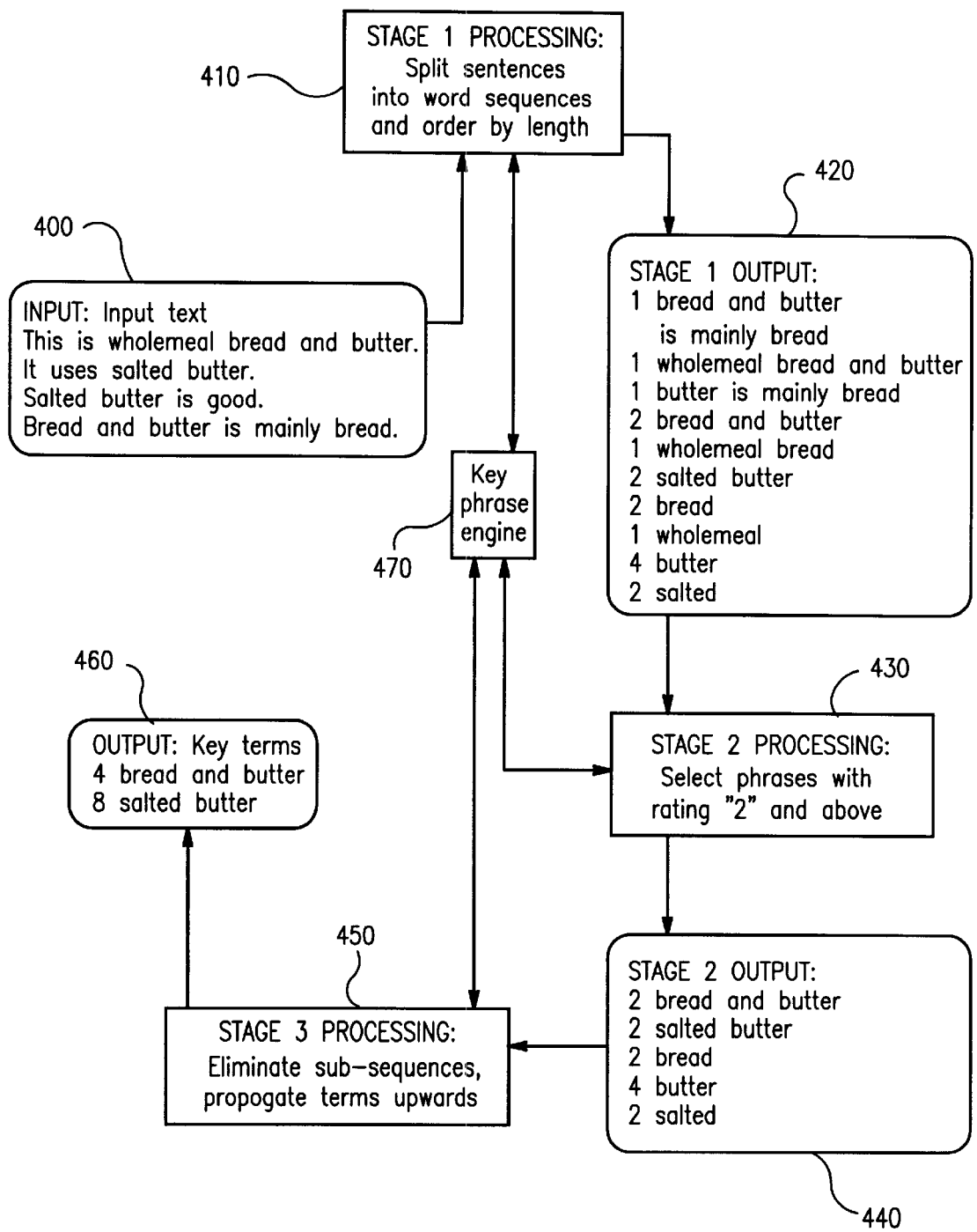
FIG. 4 illustrates the application of a preferred method of key term extraction to a particular example.

Referring to FIG. 3 and to FIG. 4, selected steps in the above algorithm will now be described with reference to a particular example using text as shown in FIG. 4:

step 305: sentence splitting at full stops—care is taken not to split on abbreviations (the abbreviations database 125 may be used for this purpose). Following receipt at step 300, the input text is split into the following sentences (400):

This is wholemeal bread and butter.

It uses salted butter.

Salted butter is good.

Bread and butter is mainly bread.

step 310: identify word groups—Stage 1 processing 410, under the control of Key Term Engine 470 preferably implemented as a functional component of the key term extractor 100, begins by identifying word groups of one or more words from the sentences identified in the input text 400. Before stemming, the word groups (420) may be identified as follows:

bread and butter is mainly bread
wholemeal bread and butter
butter is mainly bread
bread and butter
wholemeal bread
salted butter
bread
wholemeal
butter
salted The mechanism for identifying word groups is further discussed below.

step 320: stemming and capitalisation—although not required by the present example, Stage 1 processing 410 may involve stemming to remove prefixes and suffixes from words in a word group so as to reduce each word to a neutral representative form. For example, stemming would reduce the phrases "surfing the net", "surf the net" and "surfs the net" to one representative phrase "surf the net". Preferably, prefixes and suffixes are stored in association with the neutral form so that it can be reconstructed at step 350.

Stage 1 processing 410 may also involve capitalisation—the process of identifying those words that need to begin with a capital letter (such as a person's name) and those words that do not, for example words at the start of a sentence. Most acronyms contain capitals as do other abbreviations. Identifying those words that need capitalisation allow them to be presented in this form by step 350. Typically, capitalisation information is stored in association with the particular word so that it may be retrieved by step 350.

step 325: stage 1 processing 410 may also assign initial weights to the identified word groups to complete the stage 1 output 420 as follows:

1 bread and butter is mainly bread
1 wholemeal bread and butter
1 butter is mainly bread
2 bread and butter
1 wholemeal bread
2 salted butter
2 bread
1 wholemeal
4 butter
2 salted Stage 2 processing 430, under the control of key term engine 470, removes all word groups of weight 1 from the stage 1 output 420 to leave the following set of word groups as stage 2 output 440:

2 bread and butter
2 salted butter
2 bread
4 butter
2 salted step 330: stage 3 processing 450, also under the control of key term engine 470, propagates word groups upwards, removing sub-string terms, resulting in the output 460 of key terms as follows:

4 bread and butter (original 2+2 from 'bread')
8 salted butter (original 2+2 from 'salted' and 4 from 'butter')

The value for the term 'bread and butter' is not increased by the value '4' from 'butter', since the present method dictates that 'butter' should only propagate up as far as the two-word term 'salted butter', before it is discarded i.e. the single term 'butter' is discarded at the first instance of it being identified as a sub-string of a longer word group.

step 335: possible splitting of long word groups. Although not needed in this example, a normal maximum word group length would be around 5 or 6 words. However, in the present example, if the maximum acceptable word group length was set to 2 then it would be necessary to return to step 310 in order to split "bread and butter".

For the example of FIG. 4, described above, word splitting will be demonstrated by the further steps in Table 1 as follows, beginning with Stage 3 processing 450:

TABLE 1

| Stage 3 (propagate terms upwards) | Stage 4 (step 310) (term splitting 1, split "bread and butter") | Repeat Stage 3 (propagate terms upwards) | Repeat Stage 4 (no change: terms of maximum length or less) | Stage 5 (step 340) (Scale terms by their length) |
|---|---|---|---|---|
| 4 bread and butter | 4 bread | 8 salted butter | 8 salted butter | 4 salted butter |
| 8 salted butter | 4 butter | 4 bread | 4 bread | 4 bread |
|  | 8 salted butter |  |  |  |

A preferred method for splitting long word groups is to find a word towards the centre of the group that is unlikely to be contained within sub-string of a longer term. A preferred strategy would be first to look for words with a disjunctive nature: for example 'but' and 'or' before considering conjunctive terms such as 'and' or 'of'.

However, where there are no disjunctive terms and only conjunctive terms in the word group, it is possible to adopt a compromise between a long word group and splitting of the word group at a conjunctive word. For example, leaving the conjunctive word in place may only increase the length of the word group by one or two words, in which case it may be worth retaining the longer word group.

step 340 : (reverting to the "non-split" word groups above, i.e. word groups with a maximum length of 6) word groups may be scaled by their length, i.e. the number of words in the word group. This would give the results:

| 1.33 | bread and butter | (4 divided by 3) |
| 4.0 | salted butter | (8 divided by 2) |

Sorting these terms by scaled weights produces:

| 4.0 | salted butter |
| 1.33 | bread and butter |

This step is included because it has been found through observation to enhance the reliability of key terms produced. It is believed that normalisation operates to compensate for the additional weightings that longer terms may receive. This compromise may be preferred as some, but not all longer terms may contain more concentrated information about the subject matter of a data set than short terms. And, vice versa, some, but not all short terms may contain more concentrated information about the subject matter of a data set than some long terms.

step 345: limiting the number of word groups presented as key terms. For this step it is preferable to have a set of strategies that produce a limited number of key terms for a wide range of documents. The following strategies may be used singularly or in any combination:

Display consecutive terms until the combined total weight of the presented terms rises to a configurable fraction of the combined total weights of all keywords. The formula might be for instance:

$$\Sigma\text{displayed weights}<=\Sigma\text{all weights}/1.5$$

With the following scores, for example:
4 3 3 2 1 1 1 only the first three terms would be displayed. The denominator 1.5 for the second term in the formula has been found to produce good results. Other values greater than one could be used.

Display consecutive terms until the ratio of adjacent term weights falls below a configurable value. The termination formula might be for instance:

$$\text{weight}(i+1)<=\text{weight}(i)/2$$

With the following scores, for example:
4 3 3 1 1 1 1 only the first three terms would be displayed. The denominator 2 for the second term in this formula has been found to produce good results.

Display consecutive terms until the ratio of term weight to initial term weight falls below a configurable value. The termination formula might be for instance:

$$\text{weight}(i)<=\text{weight}(1)/3$$

With the following scores, for example:
4 3 3 1 1 1 1 only the first three terms would be displayed

Limit the display of consecutive terms allowed by the above rules to a configurable maximum, but exceeding that number if necessary to include a complete block of equal-weight terms. The value 7 has been found to be useful, as it will provide 7 key terms for a data set. With the following scores, for example:
10 8 7 6 6 5 5 5 4 4 the first nine terms would be displayed

Treat single-word terms specially, aborting the display of consecutive terms when a single-word term is encountered at or after a configurable position. The value 3 has been found to be useful. In the following example, the plural numbers represent the number of words in any term. The terms are ranked according to weight. With the following set, for example:
1 3 4 3 1 2 4 only the first 4 terms would be displayed, regardless of their weights.

Display a minimum number of terms regardless of the above restrictions, but exceeding that number if necessary to include a complete block of equal-weight terms. The value 2 has been found to be useful. With the following scores, for example:
5 2 2 2 1 1 the first four terms would be displayed.

step 350: mapping terms back to their original form—this follows on from step 320 and is the process of placing words in a word stemmed state or with altered capitalisation back into a format that can be presented to an operator.

Consider, for example, a document containing the phrases:
Surfing the net (at the start of a sentence)
surf the net
surfs the nets Stemming and disregarding of letter case at step 320 will typically have caused these terms to map onto:
surf the net Providing that an appropriate record was retained of removed prefixes or suffixes, step 350 may map the stemmed phrase back to a single, representative phrase for display, involving resolving case differences and choosing which word endings to apply. Here, a sensible choice may be:

surfing the net

In the general case, this may be achieved in two steps: case resolution and prefix/suffix reconstruction.

case resolution: in general, lower case is preferred unless there is an upper case first letter of a sentence. In that situation, case information is considered unreliable (unless the rest of the word also has some capitalisation).

suffix reconstruction: a set of empirically-determined rules may be applied. First a list may be made of all the endings of a particular word that occur in the text. This information may previously have been stored at step 320. If more than one ending exists, the rules listed in Table 2 as follows, may be applied in sequence until a match is found:

TABLE 2

| endings present | ending to use |
| --- | --- |
| -ing & -ation | *-ing |
| -y & -ies | -y |
| -ion | -ion |
| -ation | -ation |
| -ing | -ing |
| -ment | -ment |
| -ions | -ions |
| -ings | -ings |
| -ments | -ments |
| -ance | -ance |
| -ence | -ence |
| bare word & -s | bare word |
| bare word & -ed | bare word |
| bare word & -e | -e |
| -ant & -ance | -ance |
| -ent & -ence | -ence |
| -nt & -nce | -nce |

*-as long as neither bare word nor -s is present

If no match is found, the longest form (or one of the longest forms) of the word may be taken.

The preferred key term extraction process outlined in the flow diagram of FIG. 3 will now be described and demonstrated in more detail using the abstract example from above, in which letters represent words. Preferred implementations of key steps within the process of FIG. 3 will be described in detail, using the abstract example to demonstrate the effects of applying those steps.

Referring to FIG. 3, step 305 may be implemented without difficulty using a known text scanning technique to identify sentences with reference to the abbreviations database 125 and using standard rules on punctuation as required. The output from step 305 in the present demonstration provides the following identified sentences, as used above:

abCdEF

PQbCdE bEFCdP

CdEbEF

While the sentences used in this example are of the same length, for simplicity, the method of FIG. 3 and the specific implementations to be described below are designed to operate in the general case, in which sentences may be of different lengths.

The first sentence "a b C d E F" would be split, by step 310, into the following word groups:

| a b C d E F | b C d E F | C d E F | d E F | E F | F |
| a b C d E | b C d E | C d E | d E | E | |
| a b C d | b C d | C d | d | | |
| a b C | b C | C | | | |
| a b | b | | | | |
| a | | | | | |

Organising these in order of decreasing length of word group gives the following list:

a b C d E F
a b C d E
b C d E F
a b C d
b C d E
C d E F
a b C
b C d
C d E
d E F
a b
b C
C d
d E
E F
a
b
C
d
E
F

Figure 5:
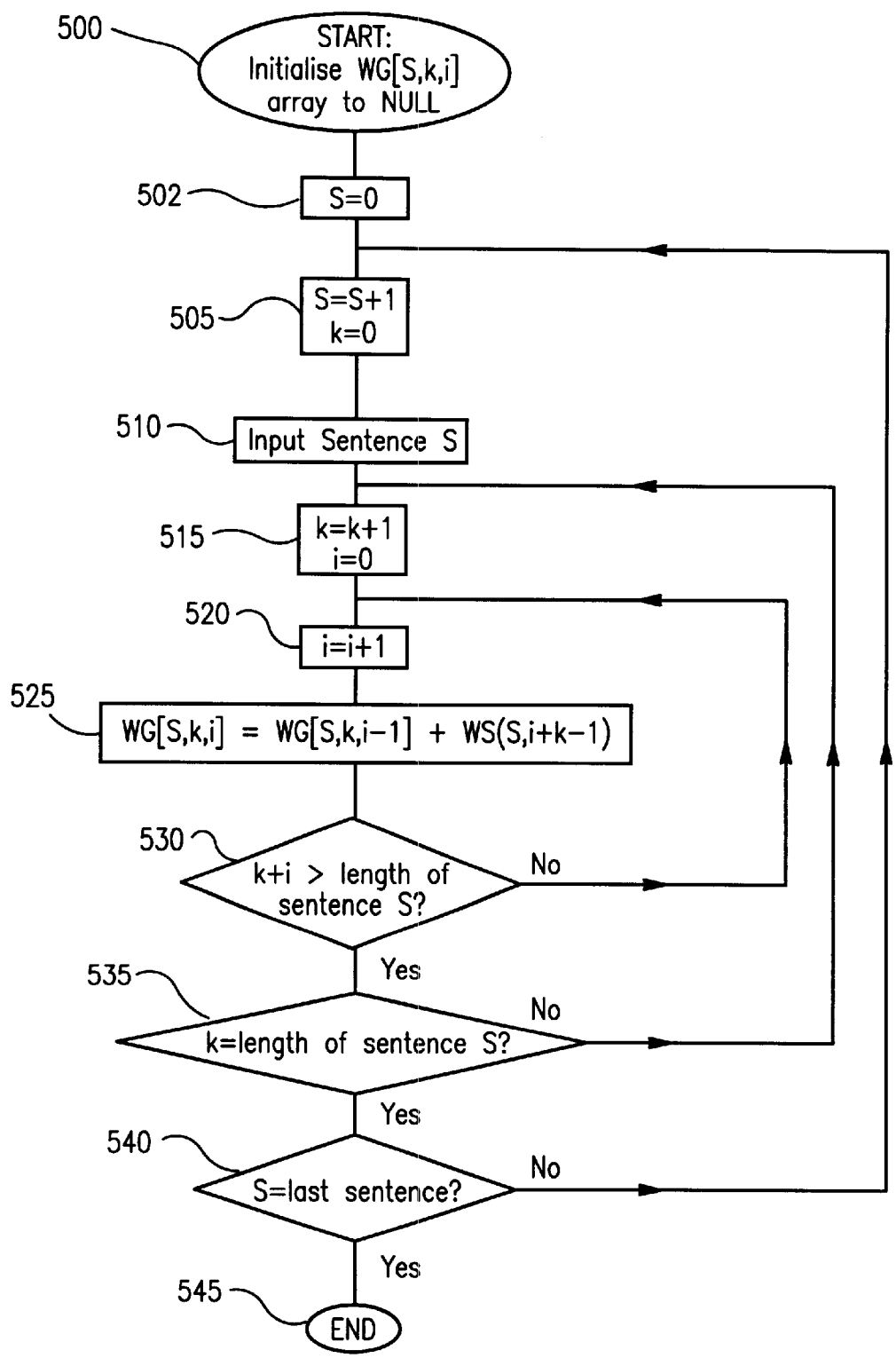
FIG. 5 is a flow diagram showing, in more detail, preferred processing steps to implement step 310 of FIG. 3.

Referring additionally to FIG. 5, a flow diagram is provided to show a preferred algorithm for splitting identified sentences into word groups, implementing step 310 of FIG. 3. The sentence splitting algorithm generates an array of word groups similar to those above, each word group being contained within an element of an array variable "WG[S,k,i]", where "S" is a number identifying a sentence, "k" represents a word position within the sentence S at which the word group begins and "i" is the length of the word group. In the above example, for sentence 1 "abCdEF", S=and WG[1,1,1]='a', WG[1,1,2]='ab', WG[1,2,1]='b', WG[1,2,2]='bc' and WG[1,2,3]='bCd'. The algorithm of FIG. 5 also uses a function "WS(S,i)" to return the $i^{th}$ word of sentence S. For sentence 1 in the above example, WS(1,1)='a' and WS(1,4)="d".

Initially, at Step 500, each element of the word group array is set to a null and a sentence counter S is initialised to zero. It is assumed that the array is dimensioned to accommodate the largest expected input text.

At Step 505, the sentence counter S is incremented, initially to select the first sentence identified from Step 305 of FIG. 3, and the word position counter k is initialised to zero. At Step 510, the sentence S is input. At Step 515, the word position counter is incremented, initially to point to the first word of sentence S, and the word group length "i" is initialised to zero. The word group length "i" is incremented at Step 520 and, at Step 525, a new word group is constructed using the previously constructed word group of length i−1, starting at word position k of sentence S, (WG[S,k,0] is assumed to be null for all values of S and k), to which is appended the next following word in the sentence, occurring at word position i+k−1. Function "WS (S,i)" returns the word at word position i in sentence S. At Step 530, a test is performed to detect whether any words remain for use in constructing longer word groups from the sentence S, beginning from word position k, using knowledge of the length of the sentence S. If the end of the sentence has not been reached, then the processing returns to Step 520, incrementing the word group length i. However, if the end of the sentence has been reached, then at Step 535 a test determines whether the word position counter k is pointing to the last word of the sentence S. If not, then the processing returns to Step 515 and the word position for new word groups in sentence S is advanced by one and the length variable i reset to zero as above. However, if the end of the sentence has been reached at Step 535, then at Step 540 a test determines whether the last sentence has been processed. If not, then processing returns to Step 505 and the next identified sentence is selected. If, at Step 540, all sentences have been processed, then this algorithm and hence Step 310 of FIG. 3 is complete and an array WG[] of all the possible word groups has been constructed from the identified sentences from Step 305.

Applying the algorithm of FIG. 5 to the identified sentences of the present demonstration produces the following word groups, arranged in sentence order in Table 3 as follows:

TABLE 3

| i | SENTENCE 1 | | SENTENCE 2 | SENTENCE 3 | SENTENCE 4 |
|---|---|---|---|---|---|
| 6 | a b C d E F | (k = 1) | P Q b C d E | b E F C d P | C d E b E F |
| 5 | a b C d E | (k = 1) | P Q b C d | b E F C d | C d E b E |
|   | b C d E F | (k = 2) | Q b C d E | E F C d P | d E b E F |
| 4 | a b C d | (k = 1) | P Q b C | b E F C | C d E b |
|   | b C d E | (k = 2) | Q b C d | E F C d | d E b E |
|   | C d E F | (k = 3) | b C d E | F C d P | E b E F |
| 3 | a b C | (k = 1) | P Q b | b E F | C d E |
|   | b C d | (k = 2) | Q b C | E F C | d E b |
|   | C d E | (k = 3) | b C d | F C d | E b E |
|   | d E F | (k = 4) | C d E | C d P | b E F |
| 2 | a b | (k = 1) | P Q | b E | C d |
|   | b C | (k = 2) | Q b | E F | d E |
|   | C d | (k = 3) | b C | F C | E b |
|   | d E | (k = 4) | C d | C d | b E |
|   | E F | (k = 5) | d E | d P | E F |
| 1 | a | (k = 1) | P | b | C |
|   | b | (k = 2) | Q | E | d |
|   | C | (k = 3) | b | F | E |
|   | d | (k = 4) | C | C | b |
|   | E | (k = 5) | d | d | E |
|   | F | (k = 6) | E | P | F |

At the completion of step 310, all of the possible word groups for each sentence of the input text have been identified and read into the word group array WG[]. The next step, step 315, in the method of FIG. 3 is to remove any "low value" words from the beginning and end of each word group. Low value words are words such as 'is', 'it', 'are', 'they' 'and' etc that do not tend to reflect the subject matter of the data set (e.g. text) from which key terms are being extracted, particularly when they occur in leading or trailing positions within word groups. Preferably, low value words may be identified with reference to the low value word and abbreviations database 125.

Figure 6:
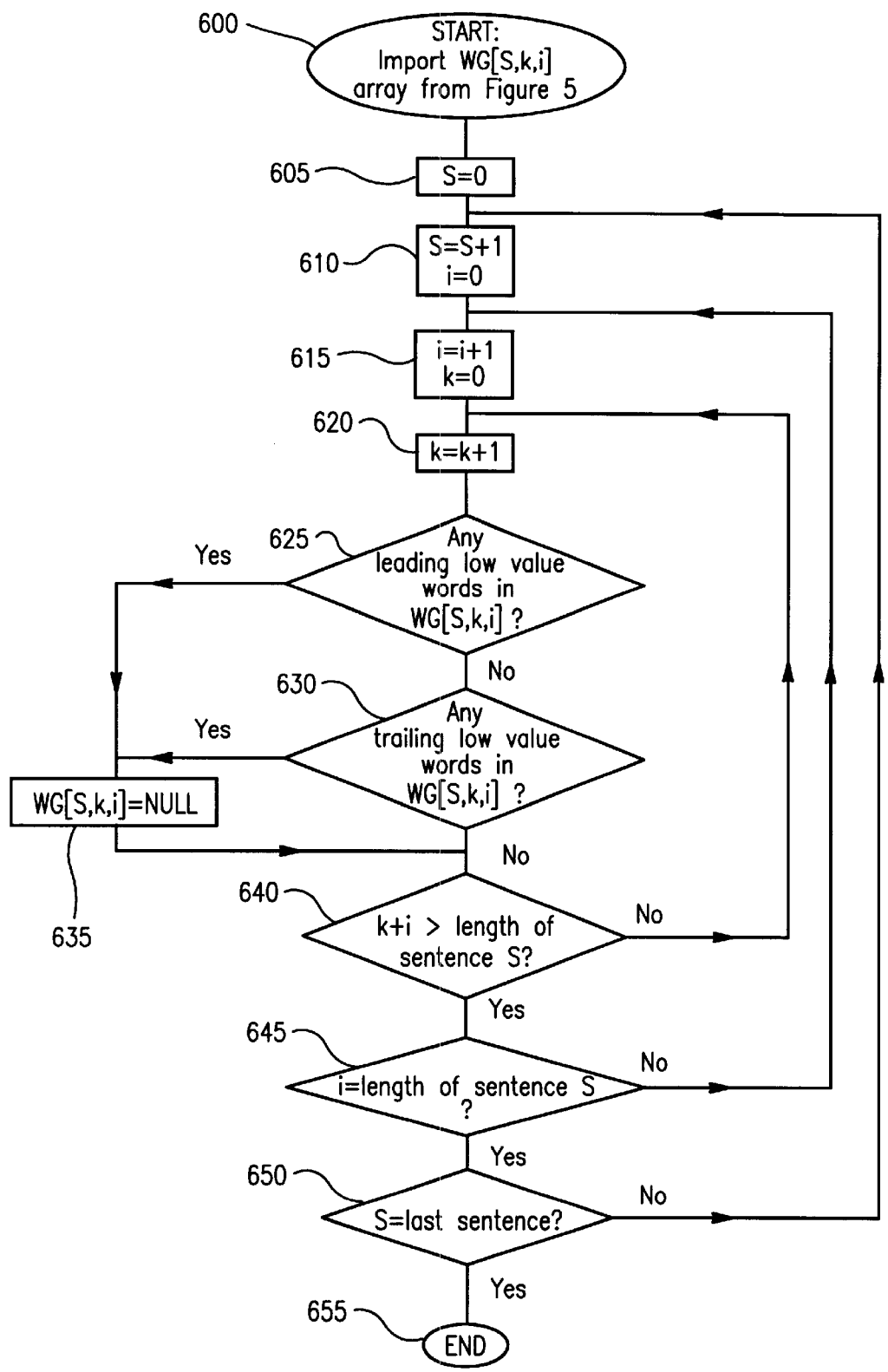
FIG. 6 is a flow diagram showing, in more detail, preferred processing steps to implement step 315 of FIG. 3.

Referring to FIG. 6, a flow diagram is provided to show a preferred algorithm for removing low value words. This algorithm operates on the basis that, with all possible word groups now contained in a word group array, including word groups with and without leading or trailing low value words, removal of a low value word will simply result in a misleading duplicate of one of the other word groups. Therefore, rather than actually remove leading and trailing low value words from word groups, the algorithm of FIG. 6 simply eliminates from the WG[] array all word groups having leading or trailing low value words by setting the appropriate array element to null. The result will be an array containing all the possible word groups without leading and trailing low value words.

Referring to FIG. 6, the algorithm begins at Step 600 by importing the word group array resulting from the algorithm of FIG. 5 (step 310). After initialising the sentence counter S at Step 605, the algorithm performs three nested analysis loops to scan all elements of the WG[] array. The outer loop begins at Step 610 by incrementing the sentence counter, initially to select the first identified sentence, and initialising the word group length i. At Step 615, the start of the middle loop, the word group length is incremented, initially to select word group array elements having length 1, and the word position counter k is initialised. At Step 620, the start of the inner loop, the word position counter k is incremented, initially to select word groups of length i beginning with the first word in sentence S. Step 625 tests for any leading low value word in the selected word group WG[S,k,i]. If none is found, then at Step 630, any trailing low value words are sought. If none are found, then the word group is preserved and processing moves to the next word group element by way of Step 640, in a similar way to Step 530 above. If either a leading or trailing low value word is found in steps 625 or 630 respectively in the selected word group WG[S,k,i], then at Step 635 that word group element is set to null, so eliminating that particular word group from the array, and processing proceeds to Step 640. As with Step 530 of FIG. 5, Step 640 determines whether any further word groups of length i exist from sentence S beginning at word position k, using knowledge of the length of sentence S. If any remain, then processing on the inner loop returns to Step 620 where the word position counter k is incremented. If none remain at Step 640, then Step 645 determines whether the word group length i is now equal to the length of the current sentence S and hence no word groups of length greater than i can exist. If not equal to the length of sentence S, processing on the middle loop returns to Step 615 where the length variable i is incremented and the next longer word groups may be analysed. If the longest word groups have now been analysed at Step 645, then at Step 650 the last sentence is tested for. If sentence S is not the last, then processing on the outer loop returns to Step 610, otherwise the algorithm ends at Step 655, the word groups having leading and trailing low value words having been eliminated from the word group array.

Applying the algorithm of FIG. 6 to the word groups of Table 3 produces:

TABLE 4

| SENTENCE 1 | SENTENCE 2 | SENTENCE 3 | SENTENCE 4 |
|---|---|---|---|
|  | P Q b C d E |  | C d E b E F |
|  |  |  | C d E b E |

TABLE 4-continued

| SENTENCE 1 | SENTENCE 2 | SENTENCE 3 | SENTENCE 4 |
|---|---|---|---|
|  | Q b C d E | E F C d P |  |
|  | P Q b C |  |  |
| C d E F | F C d P | E b E F |  |
|  |  |  | C d E |
|  | Q b C | E F C |  |
| C d E |  |  | E b E |
|  | C d E | C d P |  |
|  | P Q |  |  |
|  |  | E F |  |
|  |  | F C |  |
| E F |  |  | E F |
|  | P |  | C |
|  | Q | E |  |
| C |  | F | E |
|  | C | C |  |
| E |  |  | E |
| F | E | P | F |

In Table 4, those having leading or trailing low value words, trivially including those word groups consisting only of one or more low value words, have been eliminated and are represented by blank spaces in the table.

The next step, step 320, in the algorithm of FIG. 3, is to arrange word groups according to length and to implement word stemming. In the specific implementation being described, ordering word groups by length is not specifically required given the nature of the word group array WG[], unless required for display purposes. Word stemming is the removal of prefixes and suffixes from words. For example, the process of stemming would reduce the word groups "surfing the net" and "surfs the net" to the same word group, namely "surf the net". This is achieved by removing both the suffixes "ing" and "s" respectively from the two occurrences of the word "surf".

Figure 7:
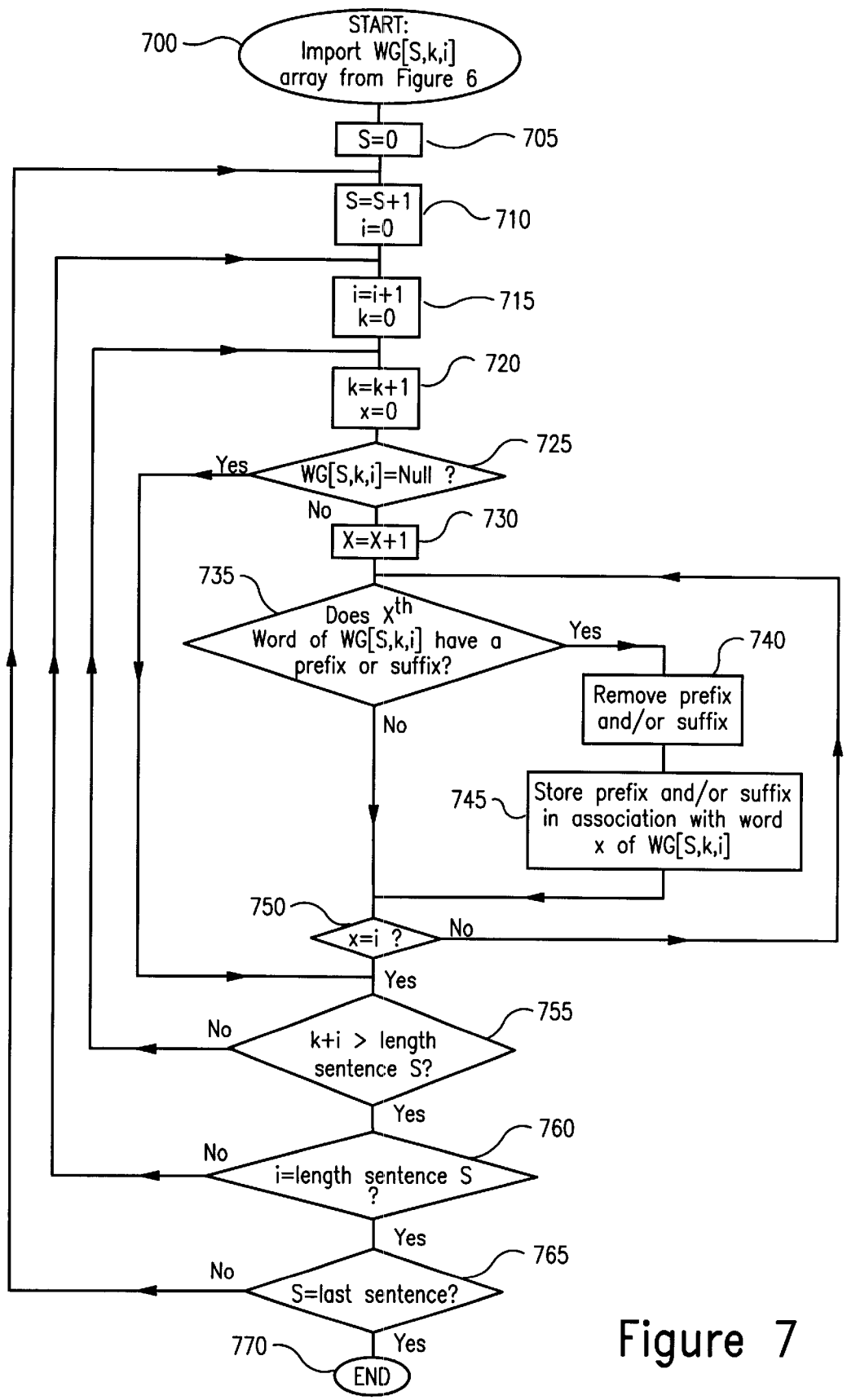
FIG. 7 is a flow diagram showing, in more detail, preferred processing steps to implement step 320 of FIG. 3.

Referring to FIG. 7, a flow diagram is provided to show a preferred algorithm for stemming words and recording an association between the stemmed word and any prefixes or suffixes removed. Preferably, in practice, the algorithms of FIG. 6 and FIG. 7 may be combined. The method of scanning the array of word groups is identical between the two algorithms. The algorithm of FIG. 7 begins at Step 700 by importing the word group array resulting from operation of the algorithm of FIG. 6 (step 315). After initialising the sentence counter S at Step 705, the algorithm performs three nested analysis loops to scan all elements of the WG[] array, identically with FIG. 6, beginning at steps 710, 715 and 720 respectively, with corresponding end-of-loop tests at steps 765, 760 and 755 respectively. Processing within the inner scanning loop of the algorithm of FIG. 7 begins, after initialising a word counter x, at Step 725 with a check that the selected word group array element WG[S,k,i] has not been set to null. If it is null, then processing skips immediately to the end-of-inner-loop test at Step 755 without further processing of that word group element. If, at Step 725, the selected word group is not null, then, at Step 730 the word counter x is incremented, initially to point to the first word of the selected word group. Step 735 tests for one or both of a prefix and suffix in the selected word x. If none is detected, then at Step 750 the word counter is compared with the selected word group length i to determine whether the last word of the word group has been processed. If words remain to be processed in sentence S, then processing returns to Step 730 to increment the word pointer x to select the next word of the word group. If, at Step 735, any prefix or suffix is found, then at Step 740, it is removed and, at Step 745, a record is made to associate the removed prefix or suffix with the resulting stemmed word, enabling later restoration. Processing then continues to Step 750 as above.

If, at Step 750, all words of the selected word group WG[S,k,i] have been processed, then the inner array scanning loop test at Step 755 is reached and the remainder of the word group array is scanned in the same way as in the algorithm of FIG. 6.

With the present demonstration using single letters to represent whole words, it is not possible demonstrate the results of word stemming.

The next step, step 325 of FIG. 3, assigns a weighting to each of the remaining word groups and eliminates those word groups occurring only once in the text of the input data set. Preferably, the weighting assigned at this stage is equal to the frequency of occurrence of the word group in the data set. However, other measures may be applied at this stage to weight word groups and to set a threshold for elimination of word groups. Step 325 and the following algorithm of FIG. 8 may complete steps in operation of the first set identifier 215 of a preferred key term extractor 100.

Figure 8:
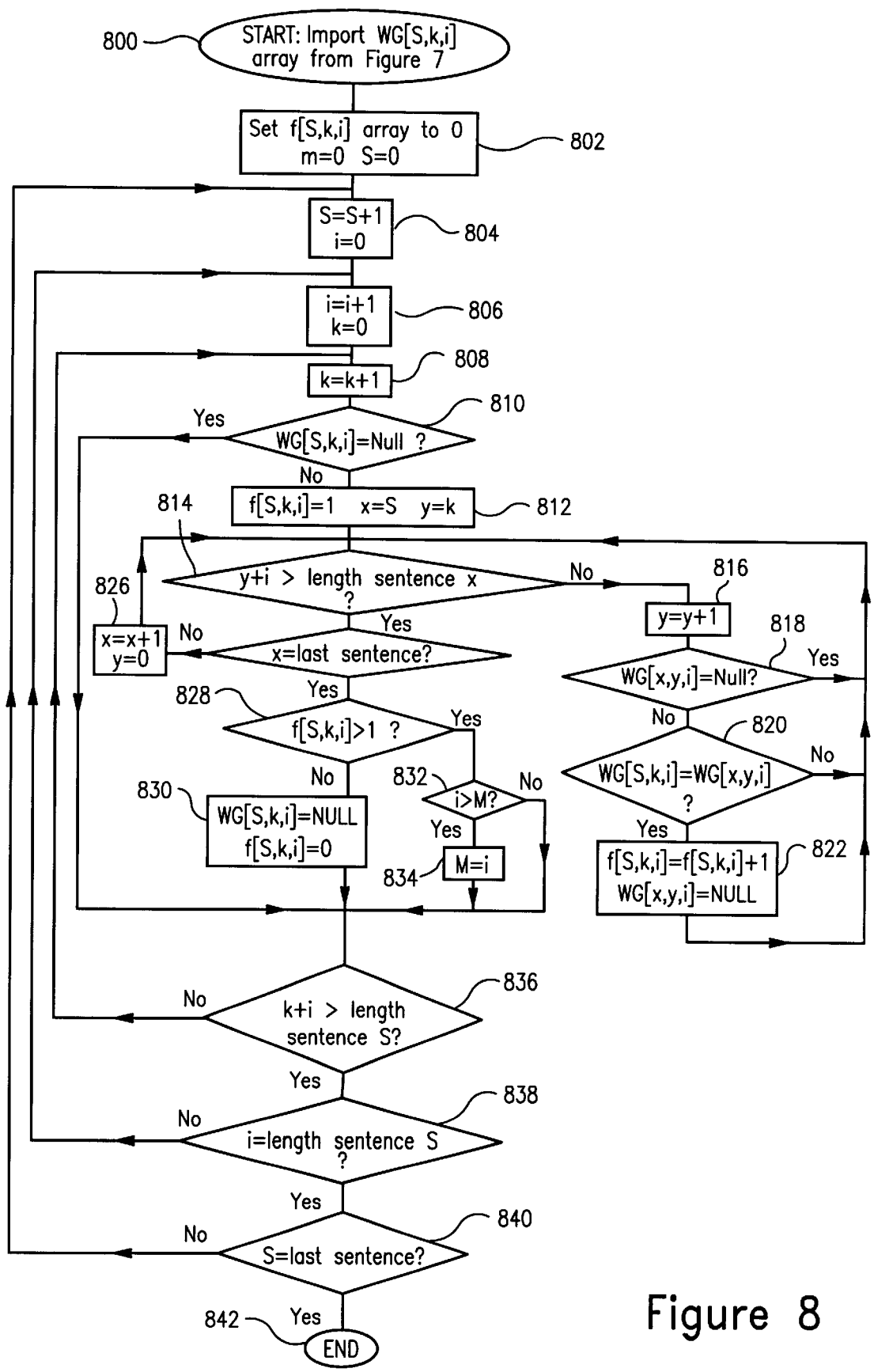
FIG. 8 is a flow diagram showing, in more detail, preferred processing steps to implement step 325 of FIG. 3.

Referring to FIG. 8, a flow diagram is presented to show a preferred algorithm for weighting word groups according to frequency and for eliminating those word groups occurring only once in the input data set. The algorithm of FIG. 8 eliminates duplicate occurrences of a particular word group from the array as it proceeds so that, on completion, only a single occurrence of each distinct word group remains within the array, with an associated record of its weighting. Weightings are recorded in an array f[S,k,i], one element for each possible corresponding element of word group array WG[S,k,i]. The algorithm of FIG. 8 also identifies, for later use, the longest remaining word group, using a variable "m". In outline, the algorithm of FIG. 8 operates by scanning the word group array WG[] in the same way as the algorithms of FIGS. 5, 6 and 7. Within the inner scanning loop, having selected a particular word group element WG[S,k,i], and having established that it is not null, remaining word groups having the same length i, i.e. those with a higher value of k within the same sentence and those in later sentences only, are checked for matching word groups. For each match found, the weighting of word group WG[S,k,i] is incremented and the matching word group is set to null to remove the duplicate.

The algorithm of FIG. 8 begins at Step 800 by importing the word group array WG[] resulting from the processing of FIG. 7. At Step 802, each element of the weightings array f[] is initialised to zero, as is the maximum word group length variable m and sentence counter S. As with FIGS. 5 to 7, the WG[] is scanned in three loops, beginning in FIG. 8 with steps 804, 806 and 808 respectively and having corresponding end-of-loop tests at steps 840, 838 and 836 respectively. Having selected a particular word group element WG[S,k,i] at Step 808, a check is made, at Step 810, for a null. If the selected element is null, then the next word group element, if any, is selected via end-of-loop Step 836.

Having selected a non-null word group element WG[S,k,i] at Step 810, Step 812 sets the corresponding weighting for that element to unity and initialises two further scanning variables x and y. Variable x is a sentence counter to enable word groups of the same length in the current and later sentences to be checked for a match with WG[S,k,i]. Variable y is a word position counter, equivalent to k. Variables x and y are initialised to the current values of S and k respectively by Step 812. At Step 814, a check is made for further possible word groups of length i within the current sentence x, beginning word positions later than position y. If any remain, then at Step 816, y is incremented to point to the next word group. If, at Step 818, the next word group is null, then processing returns to Step 814 to search for further word groups of the same length.

If, at Step 818, the next word group is not null, then at Step 820, a comparison is made with the selected word group WG[S,k,i]. If no match is found, then processing returns to Step 814 to search for further word groups of the same length as above. However, if a match is found at Step 820, then at Step 822, the weighting of word group WG[S,k,i] is incremented and the matching word group element WG[x,y,i] is set to null, having being counted, to eliminate the duplicate. Processing then returns to Step 814 to search for further word groups of the same length as above.

If, at Step 814, no further word group of the same length i remains in the current sentence x, then at Step 824, a determination is made as to whether or not the last sentence has now been searched for matching word groups. If a sentence remains to be searched, then at Step 826 the sentence counter x is incremented and the word position counter y is reset to search all word groups of length i in the next sentence. If, at Step 824, the last sentence has been searched, then at Step 828 the accumulated weighting f[x,y,i] of word group WG[x,y,i] is checked. If it is greater that unity, then the word group is retained and steps 832 and 834 ensure that the value of m records the length of the longest retained word group yet found before proceeding to Step 836. If, at Step 828, the word group WG[x,y,i] occurred only once in the data set, then it is set to null and its associated weighting is set to zero. Processing proceeds with Step 836, to continue scanning the word group array as described above in relation to the algorithm of FIG. 6.

On completion of the algorithm of FIG. 8, and hence of step 325 of FIG. 3, the word group array WG[] contains a single entry for each distinct word group occurring more than once in the input data set, each with a corresponding weighting recorded in the weightings array f[]. The word group array and corresponding weightings array may constitute the first set as generated by first set identifier 215. This preferred algorithm also yields a record, in the variable m, of the length of the longest surviving word group, mainly for use in the next algorithm to increase processing efficiency.

As regards the demonstration of the present example, the Table 4, on completion of processing by the algorithm of FIG. 8, emerges as follows, with the corresponding weightings included in columns headed "W":

TABLE 5

| W | SENTENCE 1 | W | SENTENCE 2 | W | SENTENCE 3 | W | SENTENCE 4 |
|---|---|---|---|---|---|---|---|
| 3 | C d E | | | | | | |
| 3 | E F | | | | | | |
| | | 2 | P | | | | |
| 4 | C | | | | | | |
| 5 | E | | | | | | |
| 3 | F | | | | | | |

In this demonstration, the variable m is equal to 3.

The next step, step 330, of FIG. 3 eliminates those remaining word groups forming sub-strings of longer remaining word groups, increasing the corresponding weightings of those longer word groups by the weightings of the eliminated sub-strings that they contain. This step may implement part of the selection criteria of the sub-set identifier 220. Processing to achieve this step begins with the shortest remaining word groups from step 325 and proceeds up through the word group hierarchy until all shorter sub-string word groups are eliminated.

Figure 9:
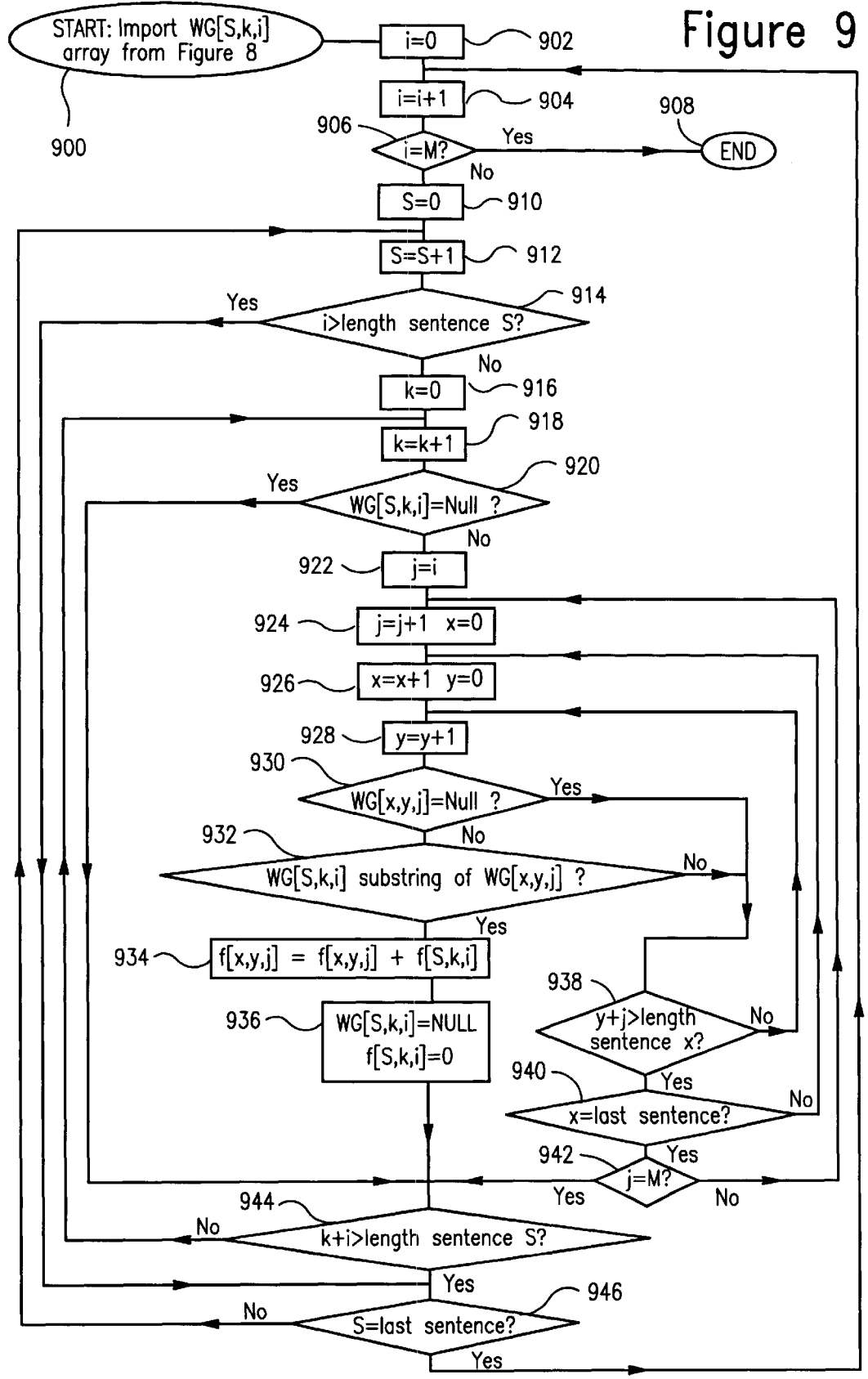
FIG. 9 is a flow diagram showing, in more detail, preferred processing steps to implement step 330 of FIG. 3.

Referring to FIG. 9, a flow diagram is presented to show a preferred algorithm for eliminating such sub-string word groups and for increasing the weighting of corresponding longer word groups accordingly. In outline, the algorithm works with one word group length i at a time, beginning with those of length i=1 and working up in increments of 1 to those of length i=m. It is not necessary to look for longer word groups than length m as none remain. On finding the shortest remaining word group WG[S,K,i], the algorithm searches all remaining word groups at the next longer length, and so on, until it finds a word group containing the word group WG[S,K,i] as a sub-string. At that point it adds the weighting of the word group WG[S,K,i] to that of the corresponding longer word group and sets WG[S,K,i] to null. Processing proceeds with the next and shortest remaining word group WG[S,K,i] until processing reaches word groups of length m, at which point the algorithm ends, with no longer word groups remaining to be processed.

The algorithm of FIG. 9 begins at Step 900 by importing the word group array WG[], the weightings array f[] and the value m output on completion of the algorithm of FIG. 8 (step 325 of FIG. 3). After initialising the word group length variable i at Step 902, an outer loop begins at Step 904 to process word groups of one length i at a time, beginning by incrementing the value of i, initially to analyse word groups of length 1. A test is performed at Step 906 to determine whether the current length i is the length of the longest remaining word group, identified from FIG. 8. If so, then no word groups of greater length remain and processing ends at Step 908.

If, at Step 906, longer word groups remain, then the sentence counter S is initialised at Step 910 and, at Step 912, the first of two loops begin to scan all remaining word groups of length i, incrementing the sentence counter S. At Step 914, included for increased processing efficiency, a check is made to determine whether the current word group length i is greater than the length of the currently selected sentence S. If no word groups are likely to be found of length i from sentence S, then processing of this sentence need not continue and may, instead, skip to Step 946 to select the next sentence, if any.

If, at Step 914, longer word groups are possible from sentence S, then at Step 916 the word position counter k is initialised and at Step 918 the second of the scanning loops begins by incrementing the word position counter k. Having selected a particular word group element WG[S,K,i] following Step 918, that element is checked for a null, at Step 920, with processing skipping to Step 944 to select the next word group array element of length i if the element is found to be null.

If, at Step 920, the currently selected word group is not null, then processing begins at Step 922 to explore longer word groups for one containing WG[S,K,i] as a sub-string. Step 922 initialises a word group length counter j to be equal to the length i of WG[S,K,i]. At Step 924, j is incremented to begin scanning the next longer word groups, and a sentence counter x is initialised to zero. For each setting of j, two loops now search the remaining word groups from each sentence x, beginning at Step 926 by incrementing the sentence counter x, initially to search WG[] array elements from the first sentence, and initialising a word pointer y. The second searching loop begins at Step 928 by incrementing the word pointer y. At Step 930, the currently searched word group element WG[x,y,j] is tested for a null. If not null, then at Step 932, it is determined whether or not word group WG[x,y,j] contains word group WG[S,K,i] as a sub-string. If it does, then at Step 934, the weighting frequency f[x,y,j] of WG[x,y,j] is increased by the weighting f[S,K,i] of WG[S,K,i] and, at step 936, word group WG[S,K,i] is eliminated by setting it to null and reducing its weighting to zero. Processing then proceeds to Step 944 to select the next word group of length i, if any remain.

If, at Step 930, currently searched word group element WG[x,y,j] is null, or if, at Step 932, word group element WG[x,y,j] does not contain WG[S,K,i] as a sub-string, then searching moves on to the next word group element of length j, if any remain, via Steps 938 and 940, in a similar fashion to the array scanning steps of FIGS. 5 to 8 above. However, if all remaining word groups of length j have been searched, following Step 940, and none were found to contain word group WG[S,K,i] as a sub-string, then at Step 942 a test is made to determine whether any longer word groups remain to be searched, comparing j with the known maximum word group length m. If j is equal to m, then no more longer word groups remain to be searched and processing proceeds to Step 944 to select the next word group of length i, if any remain, as above. If, at Step 942, further longer word groups are likely to remain to be searched, then processing returns to Step 924 to increment the length variable j, as above.

Steps 944 and 946 control the scanning of the word group array for each value of length i in the same way as the equivalent array scanning steps from FIGS. 5 to 8 described above. On completion of the algorithm of FIG. 9, a final set of key terms remain in the word group array WG[] with corresponding weightings in the weightings array f[]. These arrays may constitute an output from subtractor 230.

In the present demonstration, the result of executing the algorithm of FIG. 9 on the contents of Table 5 is the following:

TABLE 6

| W | SENTENCE 1 | W | SEN-TENCE 2 | W | SEN-TENCE 3 | W | SEN-TENCE 4 |
|---|---|---|---|---|---|---|---|
| 7 | C d E | | | | | | |
| 11 | E F | | | | | | |
| | | 2 | P | | | | |

Word groups "CdE", "EF" and "P" have now been identified as key terms of the original sentences, subject to optional further criteria to be applied at steps 335 and 345 of the key term extraction algorithm of FIG. 3.

The implementation of the remaining steps 335 to 355 of FIG. 3 will not be discussed in detail. They may be implemented in a straightforward manner. It will suffice to complete the demonstration of the present example to show how these steps may be applied in practice.

Beginning with the contents of Table 6, above, resulting from the operation of steps 300 to step 330 of FIG. 3, step 335 applies a rejection criterion to eliminate remaining word groups of a length exceeding a predetermined threshold. None of the remaining word groups will be eliminated on this basis in the present example. However, in practice, word groups of length 6 or above may, for example, be eliminated at this stage.

At step 340, word group weightings may be scaled, for example according to word group length, and sorted for presentation according to weight. In the present demonstration, the weight of CdE may divided by 3, the weight of EF may be divided 2 and the weight of P is divided by 1 resulting in the following ordered list of key terms:

| 5.5 | EF |
|---|---|
| 2.33 | CdE |
| 2 | P |

At step 345, the number of key terms may be constrained according to a predetermined criterion, dependent for example upon the use to be made of the key terms. Preferably, if any terms are to be eliminated at this stage, they may be selected from those of lower overall weight.

In the present demonstration, there is no need to limit the number of key terms, three being typically a sufficiently small set of terms to be manageable by either an operator or a data management tool set.

However, where a longer set of key terms is identified, then any of the strategies discussed above, alone or in combination, may be applied.

Once the set of key terms has been selected, it is preferable that they be reviewed by a thesaurus or dictionary or similar arrangement so as to eliminate similar terms.

For example, should the key terms "during the premier's visit" and "during the premier's trip" be returned, a thesaurus may recognise them as being equivalent terms on the basis of the equivalence of their final words as synonyms.

Accordingly, where the list of key terms has been limited by step 345 of FIG. 3, this process of identifying and rejecting similar key terms may allow a terms rejected at step 345 to be reinstated, preferably the term with the next highest weighting, although an iterative process may be required to ensure that the next term is not similar to any key terms already included in the list.

The above methods of extracting key phrases from data set may be used by a number of information management and retrieval tools.

As discussed above, these include summarisers, JASPER agents and other forms of proactive tools that use profiling techniques. Another form of tool is a search engine.

At present, typical search engines operate by investigating sites registered with them by site operators.

The search engine will store a summary or a set of key words of the site in its data base. When a user accesses a search engine to search for material, the search engine compares the search words entered against the data base so as to locate relevant sites.

One application of the present invention is to use the key phrase extractor for generating a search engine database of key words relating to sites examined by the search engine.

A further application is for use in a text summariser. Here, a set of key phrases may be identified according to the process described above. Once these key phrases have been identified, sentences and paragraphs containing these key phrases can be extracted from the text. Next, these sentences/paragraphs can be weighted according to the number of key phrases they contain.

A summary can then be generated by reproducing those sentences/paragraphs above a threshold weighting or in order of highest weighting until a pre-determined percentage of the data set or a pre-determined number of words is contained in the summary.

Where an information management or retrieval tool uses profiling techniques, such as the Jasper agent referred to above, key terms for the user profile, document term matrix or key word similarity matrix may be generated by the methods described above

What is claimed is:

1. Apparatus for managing data sets, having:
   input means for receiving a data set;
   means to identify, within a received data set, a first set of words comprising one or more word groups of one or more words, conforming to a first predetermined distribution pattern within said received data set, wherein said words in said word groups occur consecutively in said received data set;
   means to identify, within said first set, a sub-set of words comprising one or more of said word groups, conforming to a second predetermined distribution pattern within said received data set;
   means to eliminate said sub-set of words from said first set thereby forming a set of key terms of said received data set; and
   output means for outputting at least one said key term.

2. Apparatus as in claim 1 wherein said first distribution pattern requires that each word group in said first set occurs at least twice in said received data set.

3. Apparatus as in claim 2 wherein said second distribution pattern requires that each word group in said sub-set comprises a word or a string of words that occurs within a larger word group in said first set.

4. Apparatus as in claim 3 including:
   means for modifying said word groups, arranged to remove low value words occurring before the first high value word in a word group and arranged to remove low value words occurring after the last high value word in a word group.

5. Apparatus as in claim 4 including:
   means for modifying any word in any word group, arranged to remove any prefix and arranged to remove any suffix from a word to form a stemmed word.

6. Apparatus as in claim 5 including:
   means for storing said prefix or suffix in association with said stemmed word thereby enabling said prefix or suffix to be restored to said stemmed word.

7. Apparatus as in claim 1 wherein said second distribution pattern requires that each word group in said sub-set comprises a word or a string of words that occurs within a larger word group in said first set.

8. Apparatus as in claim 7 including:
   means for weighting each said word group in said first set according to how frequently each said word group occurs in said received data set; means for modifying said weighting of at least a first word group in said first set in proportion to a weighting of a second word group in said sub-set; and
   means for selecting said key terms for output in dependence upon said weightings.

9. Apparatus as in claim 8 further comprising:
   means for selecting key terms for output in dependence upon said weightings and at least one predetermined rule.

10. Apparatus as in claim 1 including:
    means for modifying said word groups, arranged to remove low value words occurring before the first high value word in a word group and arranged to remove low value words occurring after the last high value word in a word group.

11. Apparatus as in claim 1 including:
    means for modifying any word in any word group, arranged to remove any prefix and arranged to remove any suffix from a word to form a stemmed word.

12. Apparatus as in claim 11 including:
    means for storing said prefix or suffix in association with said stemmed word thereby enabling said prefix or suffix to be restored to said stemmed word.

13. Apparatus as in claim 1 including:
    means for weighting each said word group in said first set according to how frequently each said word group occurs in said received data set;
    means for modifying said weighting of at least a first word group in said first set in proportion to a weighting of a second word group in said sub-set; and
    means for selected said key terms for output in dependence upon said weightings.

14. Apparatus as in claim 1 further comprising:
    means for selecting key terms for output in dependence upon said weightings and at least one predetermined rule.

15. A method of managing data sets, said method including:
    1) receiving a data set as input;
    2) identifying a first set of words conforming to a first distribution pattern within said data set, said first set comprising one or more word groups of one or more words, wherein said words in said word groups occur consecutively in said data set;

3) identifying a sub-set of word groups in said first set, said sub-set conforming to a second distribution pattern within said data-set;

4) eliminating said sub-set from said first set thereby identifying a set of key terms;

5) outputting said key terms.

16. A method as in claim 15 wherein said first distribution pattern requires that each said word group in said first set occurs more than once in said data set.

17. A method as in claim 16 wherein said second distribution pattern requires that each said word group of said sub-set comprises a sub-string of a longer word group in said first set.

18. A method as in claim 17 including:

6) removing any low value word occurring before the first high value word in a word group and removing any low value word occurring after the last high value word in a word group.

19. A method as in claim 18 including:

7) modifying any word in any said word group by removing a prefix or suffix from the word thereby forming a stemmed word.

20. A method as in claim 19 including:

8) storing said removed prefix or suffix in association with said stemmed word thereby enabling said prefix or suffix to be restored to said stemmed word.

21. A method as in claim 20 including the steps of:

9) weighting each word group in said first set according to how frequently each said word group occurs in said data set;

10) modifying said weightings of at least a first word group in said first set in proportion to a weighting of a second word group in said sub-set;

11) selecting said key terms for output in dependence upon said weightings.

22. A method as in claim 15 wherein said second distribution pattern requires that each said word group of said sub-set comprises a sub-string of a longer word group in said first set.

23. A method as in claims including:

6) removing any low value word occurring before the first high value word in a word group and removing any low value word occurring after the last high value word in a word group.

24. A method as in claim 15, including:

7) modifying any word in any said word group by removing a prefix or suffix from the word thereby forming a stemmed word.

25. A method as in claim 24, including:

8) storing said removed prefix or suffix in association with said stemmed word thereby enabling said prefix or suffix to be restored to said stemmed word.

26. A method as in claim 15, including the steps of:

9) weighting each word group in said first set according to how frequently each said word group occurs in said data set;

10) modifying said weightings of at least a first word group in said first set in proportion to a weighting of a second word group in said sub-set;

11) selecting said key terms for output in dependence upon said weightings.

* * * * *